United States Patent [19]
Lee et al.

[11] Patent Number: 5,450,278
[45] Date of Patent: Sep. 12, 1995

[54] CHIP TYPE CAPACITOR FOR REMOVING RADIO FREQUENCY NOISE

[75] Inventors: Chang H. Lee, Daeduk-ku; Suk J. Lee, Seo-ku; Sang S. Lee, Dong-ku; Tae G. Choy, Yuseong-ku, all of Rep. of Korea

[73] Assignees: Electronics and Telecommunications Research Institute; Korea Telecommunication Authority, both of Rep. of Korea

[21] Appl. No.: 998,375

[22] Filed: Dec. 30, 1992

[30] Foreign Application Priority Data

Dec. 30, 1991 [KR] Rep. of Korea ............... 1991-26046
Dec. 30, 1991 [KR] Rep. of Korea ............... 1991-26047

[51] Int. Cl.$^6$ ..................... H01G 4/005; H01G 4/232
[52] U.S. Cl. .................. 361/303; 361/306.3; 361/313; 361/301.4
[58] Field of Search ............. 361/303, 306, 307, 313, 361/321, 306.3, 306.2, 321.2, 321.3, 330, 309, 301.4; 333/168, 185, 246; 455/307

[56] References Cited

U.S. PATENT DOCUMENTS

| | | | |
|---|---|---|---|
| 4,048,593 | 9/1977 | Zillman | 361/304 |
| 4,342,143 | 8/1982 | Jennings | 29/25.42 |
| 4,356,529 | 10/1982 | Kopel | 361/321.2 |
| 4,590,537 | 5/1986 | Sakamoto | 361/321.2 |
| 4,665,465 | 5/1987 | Tanabe | 361/321.2 |
| 4,814,940 | 3/1989 | Horstmann et al. | 361/309 |
| 5,099,387 | 3/1992 | Kato et al. | 361/321 |

FOREIGN PATENT DOCUMENTS

2156618  6/1990  Japan ................... 361/321.2

*Primary Examiner*—Bruce A. Reynolds
*Assistant Examiner*—Michael D. Switzer
*Attorney, Agent, or Firm*—Blakely, Sokoloff, Taylor & Zafman

[57] ABSTRACT

A chip type capacitor with a multi-layer structure comprising a plurality of inner electrodes classified into two groups one being used as parts of signal lines and the other being connected to grounded lines. Each of the inner electrodes for radio frequency passages has a pair of inwardly extending recesses adapted to make current flows generated in the inner electrode by radio frequency noise be opposite to each other. Each of at least two grounded inner electrode pairs is interposed between vertically adjacent inner electrodes used as parts of signal lines. The inner electrodes of each pair are connected to ground terminals, respectively, and have a shape formed by removing one protruded grounding portion from a cross shape. With this arrangement, the current flows in the inner electrodes of each pair are opposite to each other, so that electromagnetic fields generated by the current flows through the inner electrodes offset each other, thereby enabling the equivalent serial resistance at radio frequency to be decreased and the inductance to be decreased.

8 Claims, 5 Drawing Sheets

CHIP TYPE CAPACITOR FOR REMOVING RADIO FREQUENCY NOISE

BACKGROUND OF THE INVENTION

1. Field of the Invention

The present invention relates to electronic devices used for removing radio frequency noise generated from electronic appliances such as computers, communication equipments and the like, and more particularly to a chip type capacitor for removing radio frequency noise.

2. Description of the Prior Art

FIG. 1 illustrates a multi-layer structure of a conventional triple-terminal chip type capacitor which includes a multi-layer structure of two kinds of inner electrodes, so as to decrease an equivalent serial resistance of the inner electrodes.

FIG. 1, the reference numeral 2 denotes inner electrodes electrically connected to the triple-terminal chip type capacitor shown in FIG. 2 and external terminals 4' and 4" and used as a part of the sinal line for transmitting signals. On the other hand, the reference numeral 3 denotes inner electrodes electrically connected to ground terminals 5' and 5" and used as a passage for radio frequency noise being removed.

The triple-terminal chip type capacitor is coupled between signal lines 6' and 6" and serves to remove radio frequency flowing along the signal lines.

An electrical equivalent circuit for such a triple-terminal chip type capacitor is shown in FIG. 3.

In FIG. 3, the reference characters Lp and Rp denote an inductance and a resistance component of an inner electrode used as a part of a signal line. On the other hand, the reference characters Ls and Rs denote an inductance and a resistance component of an inner electrode used as a radio frequency noise passage.

The reference numeral C denotes an electrostatic capacity provided by a dielectric layer disposed between the inner electrode 2 used as the signal line and the grounded inner electrode 3 and the reference numeral G denotes an equivalent parallel conductance which is the inverse number to the resistance of the dielectric.

Generally, the triple-terminal chip type capacitor has a multi-layer structure comprising alternately layered inner electrodes of two kinds, one being used as a part of signal line and the other being connected to ground, and dielectric layers each being interposed between each pair of layered inner electrodes. The grounded inner electrodes remove radio frequency noise flowing along with signal frequencies through the inner electrodes used as a part of signal line. The frequency of noise being removed is determined by the electrostatic capacity and the inductance of each grounded inner electrode. For removing noise of radio frequency, accordingly, the inductance of grounded inner electrodes should be reduced. The equivalent serial resistance which is a real portion of the element impedance by the dielectric layers and the grounded inner electrodes 3 of the triple-terminal chip type capacitor should be reduced, in order to prevent a generation of heat and an increase in temperature. The material of inner electrodes of the triple-terminal chip type capacitor amounts to 50% to 80% of the manufacture cost. Accordingly, it can be understood that the manufacture cost can be reduced by making the area of inner electrodes as small as possible. However, the conventional triple-terminal chip type capacitors have problems of an increase in temperature due to a heat caused by radio frequency noise being removed and of a reduced expensive manufacture cost due to a large area of inner electrodes made of an expensive material.

SUMMARY OF THE INVENTION

Therefore, an object of the invention is to solve the above-mentioned problems encountered in the prior art and to provide a radio frequency noise-removing chip type capacitor with a multi-layer structure wherein each of its inner electrodes connected to ground is designed to have a shape capable of making current flows therein be opposite to each other, so that electromagnetic fields generated by the opposite current flows in the chip type capacitor offset each other, thereby enabling the equivalent serial resistance at radio frequency to be decreased and the inductance to be decreased.

Another object of the invention is to provide a radio frequency noise-removing chip type capacitor with a multi-layer structure wherein vertically adjacent inner electrodes connected to ground are designed to have shapes capable of making current flows therein be opposite to each other, so that electromagnetic fields generated by the opposite current flows in the chip type capacitor offset each other, thereby enabling the equivalent serial resistance at radio frequency to be decreased and the inductance to be decreased.

In accordance with one aspect, the present invention provides a chip type capacitor with a multi-layer structure comprising a pair of grounded electrodes as uppermost and lowermost layers, a plurality of inner electrodes for signal lines layered between the grounded electrodes, and a plurality of inner electrodes for radio frequency passages, at least one of the inner electrodes radio frequency passages being interposed between vertically adjacent ones of the inner electrodes for signal lines, and a plurality of dielectric layers interposed between vertically adjacent ones of all of the inner electrodes, the capacitor being characterized in that: each of the inner electrodes for radio frequency passages has at least one inwardly extending recesses adapted to make current flows generated in the inner electrode by radio frequency noise be opposite to each other.

In accordance with another aspect, the present invention provides a triple-terminal chip type capacitor with a multi-layer structure including an uppermost layer, a lowermost layer, a plurality of inner layers interposed between the uppermost and lowermost layers and classified into two groups one being used as parts of signal lines and the other being connected to grounded lines, and a plurality of dielectric layers each interposed between vertically adjacent ones of the inner layers, the capacitor comprising outer terminals connected to the signal lines and grounded terminals connected to grounded lines, the capacitor further comprising: a pair of grounded electrode means provided at the uppermost and lowermost layers and connected to the grounded terminals, respectively; a plurality of first electrode means interposed between the grounded electrode means and adapted to be used as parts of the signal lines; and a plurality of second electrode means adapted to be used as radio frequency passages, at least two of the second electrode means being interposed between vertically adjacent ones of the first electrode means and connected at one means thereof to one of the grounded terminals and at the other means thereof to the other grounded terminal, In accordance with another aspect, the present invention provides a triple-terminal chip type capacitor with a multi-layer structure including an uppermost layer, a lowermost layer, a plurality of inner layers interposed between the uppermost and lowermost layers and classified into two groups one being used as parts of signal lines and the other being connected to grounded lines, and a plurality of dielectric layers each interposed between vertically adjacent ones of the inner layers, the capacitor comprising outer terminals connected to the signal lines and grounded terminals connected to grounded lines, the capacitor further comprising: a pair of grounded electrode means provided at the uppermost and lowermost layers and connected to the grounded terminals, respectively; a plurality of first electrode means interposed between the grounded electrode means and adapted to be used as parts of the signal lines; and a plurality of second electrode means each adapted to be used as radio frequency passages and interposed between vertically adjacent ones of the first electrode means, vertically adjacent ones of the second electrode means being connected at one means thereof to one of the grounded terminals and at the other means thereof to the other grounded terminal.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 4:
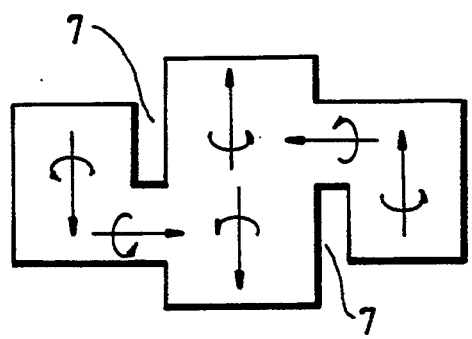
FIG. 4 is a schematic view of an inner electrode shape in accordance with an embodiment of the present invention.
Figure 5:
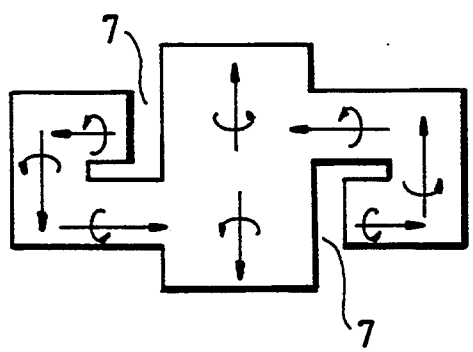
FIG. 5 is a schematic view of an inner electrode shape in accordance with another embodiment of the present invention.
Figure 6:
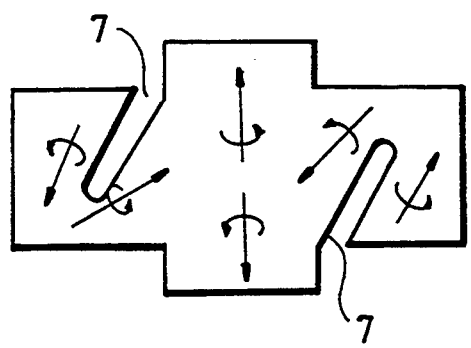
FIG. 6 is a schematic view of an inner electrode shape in accordance with another embodiment of the present invention.

FIGS. 4 to 6 are schematic views illustrating various inner electrode shapes of chip type capacitors in accordance with different embodiments of the present invention, respectively.

In FIGS. 4 to 6, the reference numeral 7 denotes recesses.

In the embodiment illustrated in FIG. 4, the inner electrode has a cross shape having a pair of vertically opposed protruded grounding portions which will be connected to ground terminals. In accordance with this embodiment, the inner electrode has a pair of recesses 7 each formed at the right side of each corresponding protruded grounding portion to extend deeply in a direction opposite to the direction that the protruded grounding portion extends, that is, toward the other protruded grounding portion. The recesses 7 serve to make current flows generated in the inner electrode by radio frequency noise be opposite to each other.

Where a chip type capacitor with a multi-layer structure is to be formed by using a plurality of inner electrodes with the above-mentioned shape, the multi-layer structure is obtained by alternately layering each of inner electrodes with the above-mentioned shape and each of inner electrodes with a shape reverse to the above-mentioned shape. By virtue of the inner electrode shape, electromagnetic fields generated by the opposite current flows in the chip type capacitor offset each other, thereby enabling the equivalent serial resistance at radio frequency to be decreased and the inductance to be decreased.

In the embodiment illustrated in FIG. 5, the inner electrode also has a cross shape having a pair of vertically opposed protruded grounding portions which will be connected to ground terminals. In similar to the embodiment illustrated in FIG. 4, the inner electrode of this embodiment has a pair of recesses 7 each formed at the right side of each corresponding protruded grounding portion to extend deeply in a direction opposite to the direction that the protruded grounding portion extends, that is, toward the other protruded grounding portion. In this embodiment, however, each recess 7 has an extension portion extending from its inner end laterally outwardly, that is, toward each corresponding outer electrode (not shown). The recesses 7 serve to make current flows generated in the inner electrode by radio frequency noise be opposite to each other.

Where a chip type capacitor with a multi-layer structure is to be formed by using a plurality of inner electrodes with the above-mentioned shape, the multi-layer structure i s obtained by alternately layering each of inner electrodes with the above-mentioned shape and each of inner electrodes with a shape reverse to the above-mentioned shape. By virtue of the inner electrode shape, electromagnetic fields generated by the opposite current flows in the chip type capacitor offset each other, thereby enabling the equivalent serial resistance at radio frequency to be decreased and the inductance to be decreased.

In the embodiment illustrated in FIG. 6, the inner electrode has a cross shape having a pair of vertically opposed protruded grounding portions which will be connected to ground terminals. In accordance with this embodiment, the inner electrode has a pair of recesses 7 each formed at the right side of each corresponding protruded grounding portion to extend deeply outwardly at a predetermined angle, The recesses 7 serve to make current flows generated in the inner electrode by radio frequency noise be opposite to each other.

Where a chip type capacitor with a multi-layer structure is to be formed by using a plurality of inner electrodes with the above-mentioned shape, the multi-layer structure is obtained by alternately layering each of inner electrodes with the above-mentioned shape and each of inner electrodes with a shape reverse to the above-mentioned shape. By virtue of the inner electrode shape, electromagnetic fields generated by the opposite current flows in the chip type capacitor offset each other, thereby enabling the equivalent serial resistance at radio frequency to be decreased and the inductance to be decreased.

In the above-mentioned embodiments, the actual area of inner electrodes which must be made of an expensive material is reduced by an amount corresponding to the area of recesses 7 formed at the inner electrodes. However, tile effective electrode area determining the electrostatic capacity is not reduced, in that inner electrodes of two kinds having one of the above-mentioned shapes and its reverse shape are alternately layered for forming a multi-layer structure of chip type capacitor.

Figure 7:
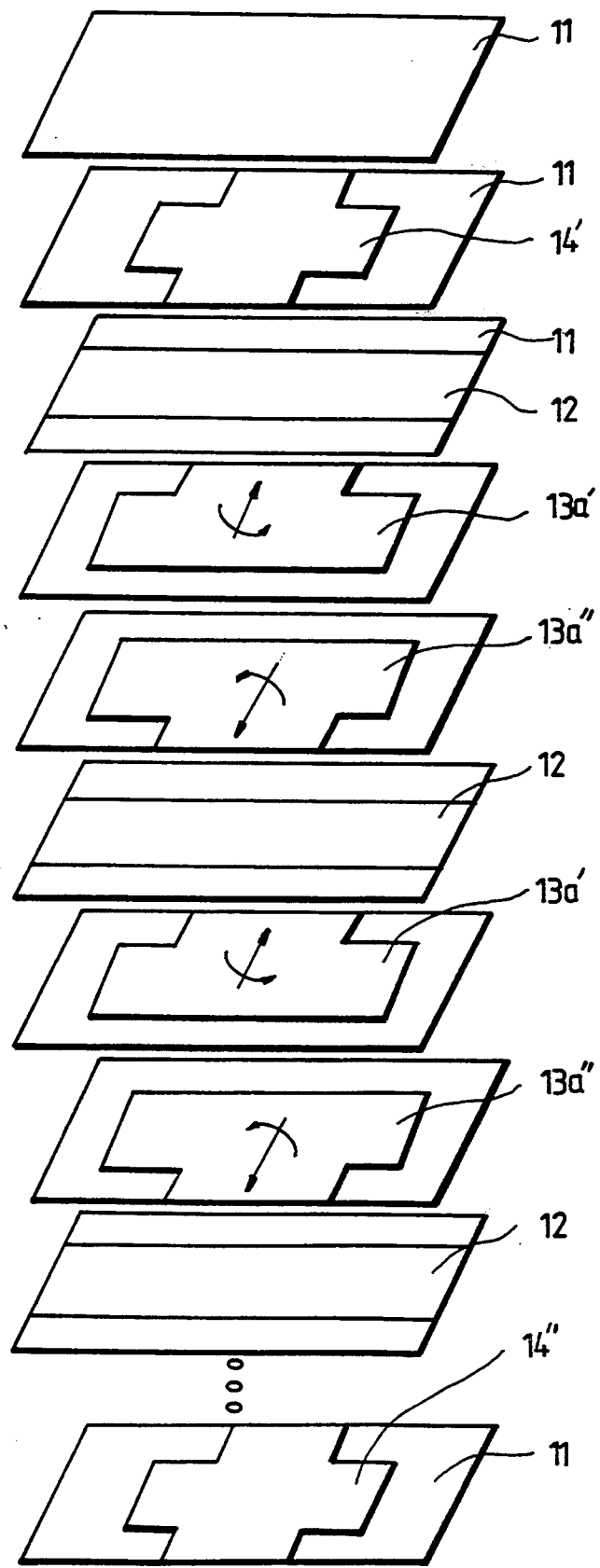
FIGS. 7 and 8 are schematic views illustrating multi-layer structures of triple-terminal chip type capacitors and their inner electrode shapes in accordance with different embodiments of the present invention, respectively.

FIG. 7 illustrates an inner electrode shape and a multi-layer structure of chip type capacitor in accordance with another embodiment of the present invention.

In FIG. 7, the reference numeral 11 denotes dielectric layers, 12 inner electrodes each used as a part of a signal line, 13a' and 13a'' grounded inner electrodes each used as a passage of radio frequency noise, and 14' and 14'' an uppermost inner electrode and a lowermost inner electrode both connected to ground, respectively.

Figure 1:
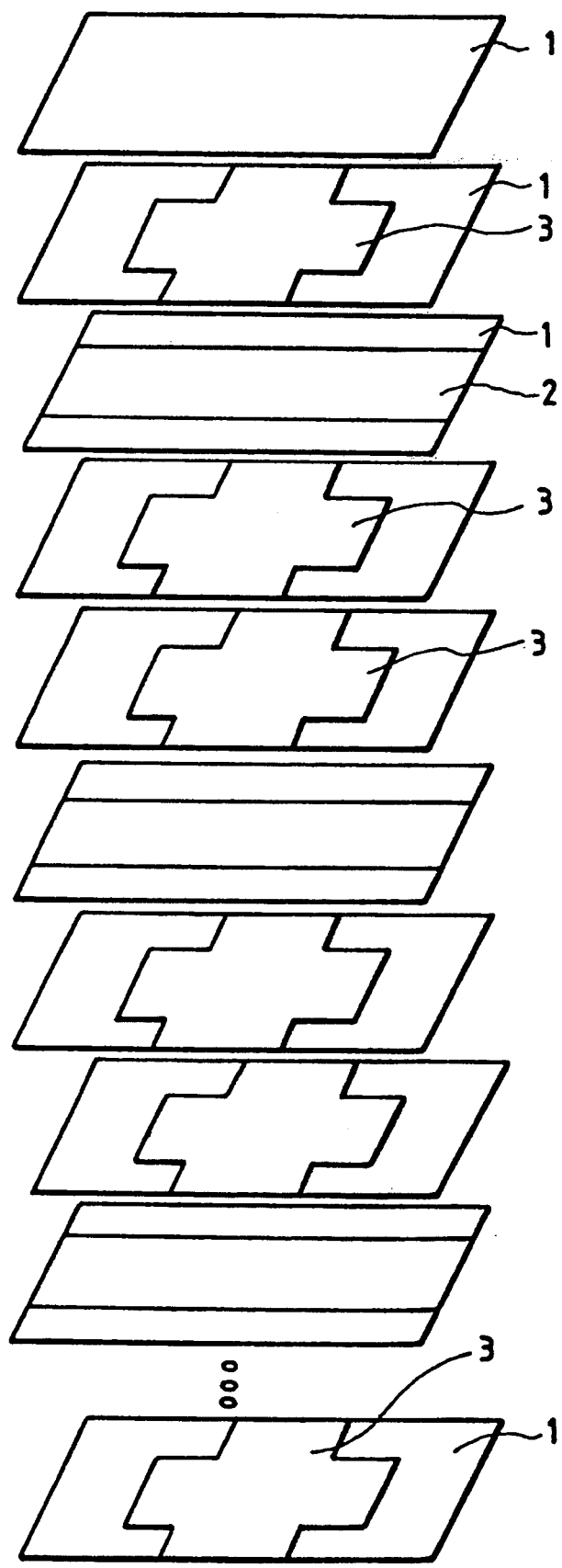
FIG. 1 is a schematic view illustrating a multi-layer structure of another conventional triple-terminal chip type capacitor and its inner electrode shape.
Figure 2:
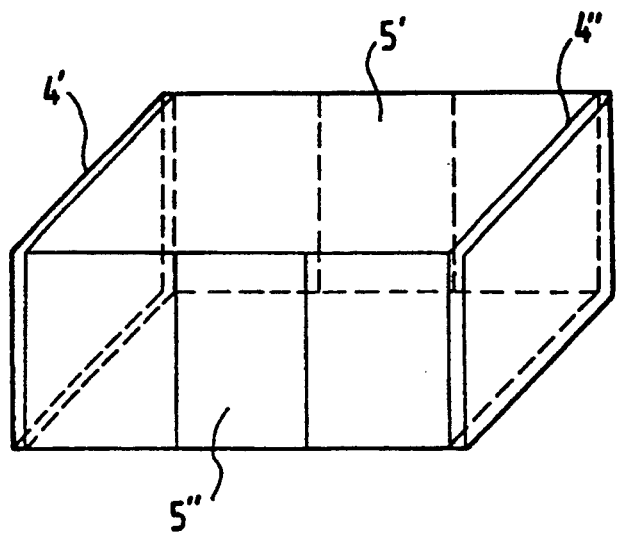
FIG. 2 is a schematic perspective view of a general triple-terminal chip type capacitor.
Figure 3:
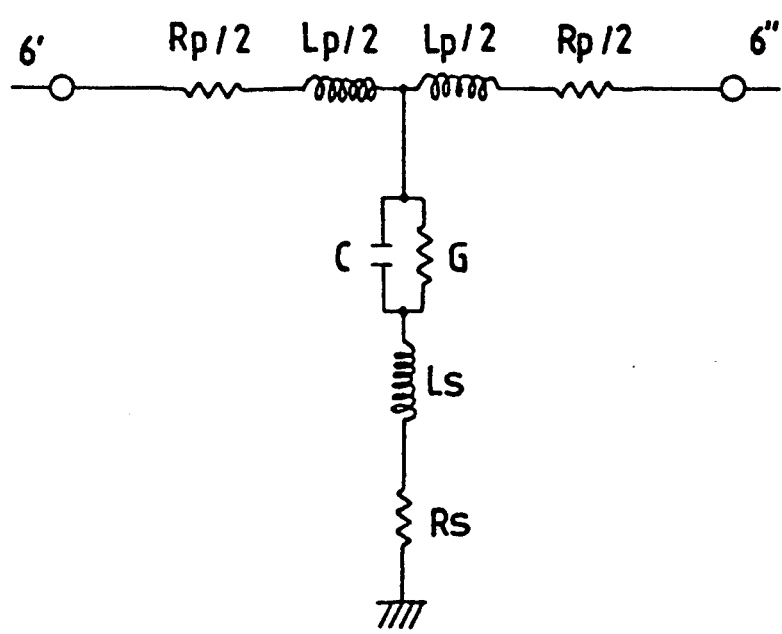
FIG. 3 is a circuit diagram of an equivalent circuit of a triple-terminal chip type capacitor.

Each of the uppermost and lowermost inner electrodes 14' and 14'' is connected to ground terminals (5' and 5'' in FIG. 3) so that during the actual operation of triple-terminal chip type capacitor, the inner electrodes 13a' and 13a'' perform their functions, even when one of grounded terminals 5' and 5'' of the triple-terminal chip type capacitor is disconnected from ground and that the potentials of the grounded inner electrodes 13a' and 13a'' are the same.

On the other hand, each of at least two inner electrode pairs each of which includes one inner electrode 13a' and one inner electrode 13a'' is interposed between vertically adjacent inner electrodes 2 used as parts of signal lines. The inner electrodes 13a' are connected to one of ground terminals 5' and 5'', whereas the inner electrodes 13a'' are connected to the other of ground terminals 5' and 5''. With this arrangement, the flow of current in the inner electrodes 13a' is opposite to the flow of current in the inner electrodes 13a'', so that electromagnetic fields generated by the current flows through the inner electrodes 13a' and 13a'' offset each other, thereby enabling the equivalent serial resistance at radio frequency to be decreased and the inductance to be decreased.

In this embodiment, the inner electrodes 13a' and 13a'' have a shape formed by removing one protruded grounding portion from the conventional cross shape.

Figure 8:
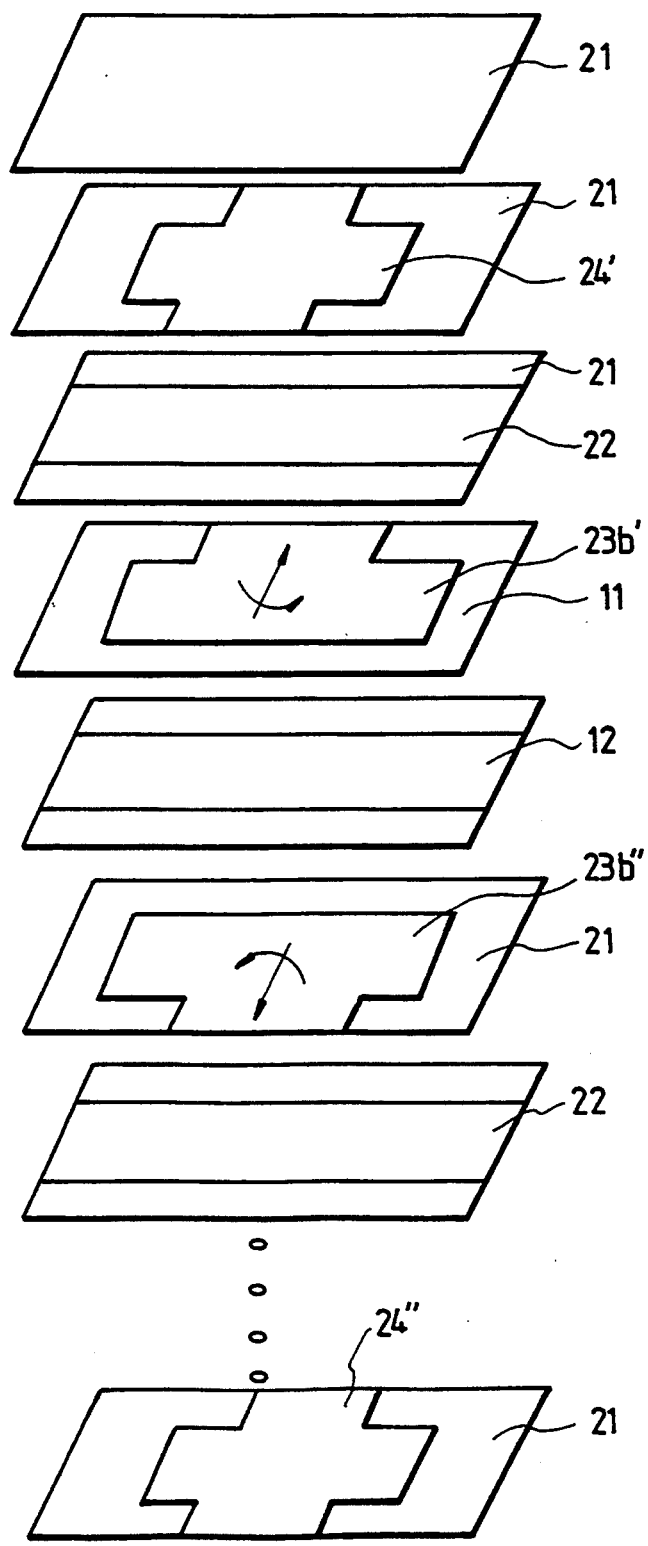

FIG. 8 illustrates an inner electrode shape and a multi-layer structure of chip type capacitor in accordance with another embodiment of the present invention.

In FIG. 8, the reference numeral 21 denotes dielectric layers, 22 inner electrodes each used as a part of a signal line, 23b' and 23b'' grounded inner electrodes each used as a passage of radio frequency noise, and 24' and 24'' an uppermost inner electrode and a lowermost inner electrode both connected to ground, respectively.

In this embodiment, each inner electrodes 23a' and each inner electrodes 23a'' are alternately interposed between vertically adjacent inner electrodes 2 used as parts of signal lines. The inner electrodes 13a' are connected to one of ground terminals 5' and 5'', whereas the inner electrodes 13a'' are connected to the other of ground terminals 5' and 5''. With this arrangement, the flow of current in the inner electrodes 13a' is opposite to the flow of current in the inner electrodes 13a'', so that electromagnetic fields generated by the current flows through the inner electrodes 13a' and 13a'' offset each other, thereby enabling the equivalent serial resistance at radio frequency to be decreased and the inductance to be decreased.

The inner electrodes 23a' and 23a'' of this embodiment also have a shape formed by removing one protruded grounding portion from the conventional cross shape, in similar to the embodiment illustrated in FIG. 7.

The shapes of inner electrodes 13a', 13a'', 23b' and 23b'' according to the present invention and shown in FIGS. 7 and 8 makes it possible to reduce the inner electrode area without decreasing the electrostatic capacity, as compared with the shape of conventional inner electrodes 3' and 3''.

The present invention provides the following effects.

In accordance with the present invention, a decrease in electrostatic capacity does not occur, even though a smaller amount of inner electrode material is used. This is because the inner electrodes used as pars of signal lines and the grounded inner electrodes have the same effective electrode area which determines the electrostatic capacity. At a higher frequency, the equivalent serial resistance of devices can be more reduced, in accordance with the present invention. The inductance of grounded inner electrodes can be greatly reduced, at a radio frequency. There is also an advantage in removing radio frequency noise, since the impedance is also reduced. The reduced amount of expensive inner electrode material makes it possible to reduce the manufacture cost.

In particular, it is possible to obtain various advantages when the chip type capacitor of the present invention is used for removing radio frequency noise causing trouble in electronic appliances such as computers and communication equipments.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A triple-terminal chip type capacitor with a multilayer structure including an uppermost layer, a lowermost layer, a plurality of inner layers interposed between the uppermost and lower most layers and classified into two groups one being used as parts of signal lines and the other being connected to grounded lines, and a plurality of dielectric layers each interposed between vertically adjacent ones of the inner layers, the capacitor comprising outer terminals connected to the signal lines and grounded terminals connected to grounded lines, the capacitor further comprising:

a pair of grounded electrode means provided at the uppermost and lowermost layers and connected to the grounded terminals, respectively;

a plurality of first electrode means interposed between the grounded electrode means and adapted to be used as parts of the signal lines; and a plurality of second electrode means adapted to be used as radio frequency passages, at least two of the second electrode means being interposed between vertically adjacent ones of the first electrode means, a first one of said at least two of the second electrode means coupled to a first one of the grounded terminals but not to a second one of the grounded terminals, a second one of said at least two of the second electrode means coupled to the second one of the grounded terminals but not to the first one of the grounded terminals wherein a current flow in the first one of said at least two of the second electrode means is opposite in direction to a current flow in the second one of said at least two of the second electrode means.

2. A triple-terminal chip type capacitor in accordance with claim 1 wherein the second electrode means have a shape formed by removing one protruded grounding portion from a cross shape.

3. A triple-terminal chip type capacitor in accordance with claim 1 wherein each of the second electrode means includes at least one inwardly extending recess adapted to make current flows generated in said each of the second electrode means by radio frequency noise be opposite to each other.

4. A triple-terminal chip type capacitor in accordance with claim 1 wherein said first one of said at least two of the second electrode means has a shape reverse to a shape of said second one of said at least two of the second electrode means.

5. A triple-terminal chip type capacitor with a multi-layer structure including an uppermost layer, a lowermost layer, a plurality of inner layers interposed between the uppermost and lowermost layers and classified into two groups one being used as parts of signal lines and the other being connected to grounded lines, and a plurality of dielectric layers each interposed between vertically adjacent ones of the inner layers, the capacitor comprising outer terminals connected to the signal lines and grounded terminals connected to grounded lines, the capacitor further comprising:

a pair of grounded electrode means provided at the uppermost and lowermost layers and connected to the grounded terminals, respectively;

a plurality of first electrode means interposed between the grounded electrode means and adapted to be used as parts of the signal lines; and a plurality of second electrode means each adapted to be used as radio frequency passages and interposed between vertically adjacent ones of the first electrode means, a first one of the second electrode means coupled to a first one of the grounded terminals but not to a second one of the grounded terminals, a second one of the second electrode means coupled to the second one of the grounded terminals but not to the first one of the grounded terminals wherein a current flow in the first one of the second electrode means is opposite in direction to a current flow in the second one of the second electrode means.

6. A triple-terminal chip type capacitor in accordance with claim 1 wherein the second electrode means have a shape formed by removing one protruded grounding portion from a cross shape.

7. A triple-terminal chip type capacitor in accordance with claim 5 wherein each of the second electrode means includes at least one inwardly extending recess adapted to make current flows generated in said each of the second electrode means by radio frequency noise be opposite to each other.

8. A triple-terminal chip type capacitor in accordance with claim 5 wherein said first one of the second electrode means has a shape reverse to a shape of said second one of the second electrode means.

* * * * *